US012618967B2

(12) United States Patent
El Bardan et al.

(10) Patent No.: US 12,618,967 B2
(45) Date of Patent: May 5, 2026

(54) RADAR-BASED CROSS-SECTIONAL IMAGE RECONSTRUCTION OF SUBJECT

(71) Applicant: One Health Group, Inc., Cazenovia, NY (US)

(72) Inventors: Raghed El Bardan, Centerville, VA (US); Albert Di Rienzo, Cazenovia, NY (US); Dhaval Malaviya, Centerville, VA (US)

(73) Assignee: One Health Group, Inc., Cazenovia, NY (US)

( * ) Notice: Subject to any disclaimer, the term of this patent is extended or adjusted under 35 U.S.C. 154(b) by 120 days.

(21) Appl. No.: 18/737,281

(22) Filed: Jun. 7, 2024

(65) Prior Publication Data

US 2024/0329236 A1      Oct. 3, 2024

Related U.S. Application Data

(63) Continuation of application No. 17/576,151, filed on Jan. 14, 2022, now Pat. No. 12,038,501, which is a continuation of application No. 16/410,474, filed on May 13, 2019, now Pat. No. 11,226,411.

(60) Provisional application No. 62/670,396, filed on May 11, 2018.

(51) Int. Cl.
*G01S 13/90*                (2006.01)

(52) U.S. Cl.
CPC ...... *G01S 13/9027* (2019.05); *G01S 13/9005* (2013.01)

(58) Field of Classification Search
None
See application file for complete search history.

(56) References Cited

U.S. PATENT DOCUMENTS

| | | | |
|---|---|---|---|
| 3,995,270 A | 11/1976 | Perry et al. | |
| 4,185,238 A | 1/1980 | Huchital et al. | |
| 5,030,956 A | 7/1991 | Murphy | |
| 5,483,962 A | 1/1996 | Shiba | |
| 5,573,012 A | 11/1996 | McEwan | |
| 6,490,471 B2 | 12/2002 | Svenson et al. | |
| 9,151,793 B1 | 10/2015 | Hassan et al. | |
| 11,226,411 B2 * | 1/2022 | El Bardan | G01S 7/2806 |
| 12,038,501 B2 * | 7/2024 | El Bardan | G01S 7/2926 |

(Continued)

FOREIGN PATENT DOCUMENTS

WO          2014194281 A1      12/2014

OTHER PUBLICATIONS

International Search Report and Written Opinion for PCT/US2019/032021 mailing date Sep. 25, 2019.

(Continued)

*Primary Examiner* — Bernarr E Gregory

(74) *Attorney, Agent, or Firm* — Banner & Witcoff, Ltd.

(57)          ABSTRACT

One or more aspects of this disclosure relate to the usage of an impulse radio ultra-wideband (IR-UWB) radar to reconstruct a cross-sectional image of subject in a noninvasive fashion. This image is reconstructed based on the pre- and post-processing of recorded waveforms that are collected by the IR-UWB radar, after getting reflected-off the subject. Furthermore, a novel process is proposed to approximate the different tissues' dielectric constants and, accordingly, reconstruct a subject's cross-sectional image.

8 Claims, 7 Drawing Sheets

(56)        References Cited

U.S. PATENT DOCUMENTS

| | | |
|---|---|---|
| 2004/0246079 A1 | 12/2004 | Ehata |
| 2015/0265204 A1 | 9/2015 | Tupin, Jr. et al. |
| 2016/0081618 A1 | 3/2016 | Han-Oh et al. |

OTHER PUBLICATIONS

R. J. Fontana, "Recent system applications of short-pulse ultra-wideband (UWB) technology," IEEE Transactions on Microwave Theory and Techniques, vol. 52, No. 9, pp. 2087-2104, Sep. 2004.

K. Yu, J.-p. Montillet, A. Rabbachin, P. Cheong, and I. Oppermann, "UWB location and tracking for wireless embedded networks," Signal Process., vol. 86, No. 9, pp. 2153-2171, Sep. 2006.

E. C. Fear, X. Li, S. C. Hagness, and M. A. Stuchly, "Confocal microwave imaging for breast cancer detection: localization of tumors in three dimensions," IEEE Transactions on Biomedical Engineering, vol. 49, No. 8, pp. 812-822, Aug. 2002.

R. M. Buehrer, W. A. Davis, A. Safaai-Jazi, and D. Sweeney, "Characterization of the ultra-wideband channel," in IEEE Conference on Ultra Wideband Systems and Technologies, Nov. 2003, pp. 26-31.

S. I. Ivashov, V. V. Razevig, A. P. Sheyko, and I. A. Vasilyev, "Detection of human breathing and heartbeat by remote radar," in Progress in electromagnetic research symposium, Mar. 2004, pp. 28-31.

M. Y. W. Chia, S. W. Leong, C. K. Sim, and K. M. Chan, "Through-wall UWB radar operating within fcc's mask for sensing heart beat and breathing rate," in European Radar Conference, Oct. 2005, pp. 267-270.

Y. Pinhasi, A. Yahalom, and S. Petnev, "Propagation of ultra wide-band signals in lossy dispersive media," in IEEE International Conference on Microwaves, Communications, Antennas and Electronic Systems, May 2008, pp. 1-10.

R. Gharpurey and P. Kinget, Ultra Wideband: Circuits, Transceivers and Systems. Boston, MA: Springer US, 2008.

A. Lazaro, D. Girbau, R. Villarino, and A. Ramos, "Vital signs monitoring using impulse based uwb signal," in 41st European Microwave Conference, Oct. 2011, pp. 135-138.

E. M. Staderini, "UWB radars in medicine," IEEE Aerospace and Electronic Systems Magazine, vol. 17, No. 1, pp. 13-18, Jan. 2002.

E. J. Bond, X. Li, S. C. Hagness, and B. D. V. Veen, "Microwave imaging via space-time beamforming for early detection of breast cancer," IEEE Transactions on Antennas and Propagation, vol. 51, No. 8, pp. 1690-1705, Aug. 2003.

C. G. Bilich, "Bio-medical sensing using ultra wideband communications and radar technology: A feasibility study," in IEEE Pervasive Health Conference and Workshops, Nov. 2006, pp. 1-9.

R. El-Bardan, D. Malaviya, and A. D. Rienzo, "On the estimation of respiration and heart rates via an ir-uwb radar: An algorithmic perspective," in IEEE International Conference on Microwaves, Antennas, Communications and Electronic Systems (COMCAS), Nov. 2017.

M. S. R. Bashri, T. Arslan, W. Zhou, and N. Haridas, "Wearable device for microwave head imaging," in 2016 46th European Microwave Conference (EuMC), Oct. 2016, pp. 671-674.

M. S. R. Bashri, T. Arslan, W. Zhou, and N. Haridas, "A compact RF switching system for wearable microwave imaging," in Loughborough Antennas Propagation Conference (LAPC), Nov. 2016, pp. 1-4.

F. Wang, X. Wu, and T. Arslan, "Mobile-controlled portable robotic measurement setup for microwave imaging diagnosis," in Loughborough Antennas Propagation Conference (LAPC), Nov. 2016.

A. Porubiakova and J. Komacka, "A comparison of dielectric constants of various asphalts calculated from time intervals and amplitudes," Procedia Engineering, vol. 111, pp. 660-665, 2015.

A. R. Martinez and A. P. Byrnes, "Modeling dielectric-constant values of geologic materials: An aid to ground-penetrating radar data collection and interpretation," 2001.

R. Knight, "Ground penetrating radar for environmental applications," Annual Review of Earth and Planetary Sciences, vol. 29, No. 1, pp. 229-255, 2001.

J. A. Huisman, S. S. Hubbard, J. D. Redman, and A. P. Annan, "Measuring soil water content with ground penetrating radar: A review," Vadose Zone Journal, vol. 2, No. 4, p. 476, 2003.

J. Holden, T. P. Burt, and M. Vilas, "Application of ground-penetrating radar to the identification of subsurface piping in blanket peat," Earth Surface Processes and Landforms, vol. 27, No. 3, pp. 235-249, 2002.

* cited by examiner

RADAR-BASED CROSS-SECTIONAL IMAGE RECONSTRUCTION OF SUBJECT

RELATED APPLICATION

This application claims priority to U. S. application Ser. No. 17/576,151, filed Jan. 14, 2022, now U.S. Pat. No. 12,038,850, which claims priority to U.S. application Ser. No. 16/410,474, filed May 13, 2019, now U.S. Pat. No. 11,226,411, which claims priority to U.S. application No. 62/670,396, filed May 11, 2018. The contents of these applications are expressly incorporated herein by reference in their entirety for all purposes.

BACKGROUND

In 2002, the Federal Communications Commission (FCC) authorized the unlicensed use of ultra-wideband (UWB) technology in the frequency range from 3.1 to 10.6 GHz (ET Docket 98-153, First Report and Order 02-48), using an adequate wideband signal format with a low equivalent isotropically radiated power (EIRP) level ($-41.3$ dBm/MHz). Since then, UWB technology has attracted growing interest across many different verticals and fields, e.g., wireless communications and a diverse set of radar sensor applications.

UWB systems can be categorized into two classes: i) multi-band orthogonal frequency division multiplexing (MB-OFDM) UWB, and ii) impulse radio UWB (IR-UWB). The former class is primarily used for applications that support exceedingly high data rates such as video streaming, and is beyond the scope of this work. However, this class is not compliant with energy-constrained applications, given that high performance electronics are required to operate an MB-OFDM radio. On the other hand, IR-UWB may be purposed to accommodate low-power consumption and low-complexity. Furthermore, an IR-UWB radar is characterized by: i) higher penetration capabilities, ii) robustness to interference and multipath, and iii) high precision ranging. The aforementioned characteristics of the latter class have motivated both the research community and the industry to explore using IR-UWB radars in energy-constrained, short-range wireless health applications.

Some have investigated the use of UWB microwave imaging for the detection of several diseases inside a human body. Others have studied how a Ground-Penetrating Radar (GPR) can help in modeling and evaluating the dielectric constants of different geologic materials. Yet others have proposed wearable microwave head imaging for stroke and cancer detection, as well as a compact and lightweight radio-frequency (RF) switching system for the first, respectively. However, those approaches focused on evaluating the antennae performance in their work. Furthermore, others have evaluated the fundamental performance of antennae positioning for microwave imaging applications. Nevertheless, those approaches primarily focused on measuring the total field on the S21 port and controlling the robotic arm using a camera. Further, some have used GPRs to calculate the dielectric constants of various asphalts from time intervals and amplitudes while others have modeled dielectric constant values of geologic materials to aid GPRs in data collection and interpretation. However, these dielectric constant modeling approaches are not feasible when used to model tissues, bones, organs, and fluids given their diversity.

SUMMARY

Systems and methods are disclosed in which a cross-section of a subject may be modeled. Radar may be used to reconstruct a cross-sectional image of a subject in a noninvasive fashion. The systems and method may be used to detect early signs of an illness or a disease, and preventing potential health risks that are tightly coupled with inferences drawn from such images. The images may be reconstructed following an estimation process in which the different dielectric constants that constitute the subject are approximated. One or more processes that operates on IR-UWB radar (or any radar in general) signals reflected off the subject at different depths may be used. One or more images may be reconstructed based on the pre- and post-processing of recorded waveforms that are collected by a radar (e.g., a IR-UWB radar), after being reflected by structures at different depths.

Further, processes are described to approximate the dielectric constants of different tissues, organs, bones, and fluids. The inferences drawn from this estimation process provide the information to reconstruct the subject's cross-sectional image. One or more arrays of dielectric constants may be obtained and sorted by proximity to the radar. A clustering method may be applied to identify the different parts of the torso or other body structure and reconstruct the image. The resulting mapping may be in grayscale or color.

One or more aspects of the disclosed process may be implemented in hardware devices, or in a general purpose computer programmed with instructions based on the described process. Additional aspects, configurations, embodiments and examples are described in more detail below.

BRIEF DESCRIPTION OF THE SEVERAL VIEWS OF THE DRAWINGS

Certain specific configurations of a modeling system and components thereof, are described below with reference to the accompanying figures.

It will be recognized by the skilled person in the art, given the benefit of this disclosure, that the exact arrangement, sizes and positioning of the components in the figures is not necessarily to scale or required. The particular sizes and angles of one component relative to another component may vary to provide a desired response or output from the component or other structures.

DETAILED DESCRIPTION

Systems, methods, and computer-readable media are described that facilitate the imaging of internal structures of living organisms. Dielectric constants of different tissues, organs, and fluids that constitute a subject at their corresponding order of depths may be estimated. These inferences are based on the pre- and post-processing of recorded waveforms that are collected by a radar (e.g., a ultra-wideband radar) used with one or more transmitter-receiver pairs. For reference, the disclosure uses the term IR-UWB radar as an example type of radar. It is appreciated that other radar systems may be used. A waveform is defined as the shape and form of a signal such as a wave moving in a physical medium.

For multiple pairs of receivers, the pairs may be controlled to operate as one or more active phased arrays and mounted on- or off-body, with the signals being reflected off the subject. In the case where two or more IR-UWB radars are used, these may be simultaneously used and they will transmit similar Gaussian modulated pulses. They may include a phase-shift in dispersal patterns when used in active phased arrays and processed with phased-array processing. Alternatively, only one radar transmitter/receiver antenna pair may be used instead. While having a more simplistic architecture, the computational complexity associated with a single transmitter/receiver pair increases.

The procedure through which the recorded waveforms are processed in order to extract these dielectric constants and, consequently, construct the subject' cross-sectional image is described in the process below.

Various tools and techniques may be used with the techniques being based on machine learning (e.g., regression, decision trees, random forest, SVM, gradient-boosting algorithms, neural nets, Markov decision process, etc.), signal processing (e.g., sampling, filtering, autocorrelation, adaptive noise cancellation, etc.), statistics (e.g., pre-processing and post-processing metrics that involve the computation of means, modes, etc.), and logic analysis (e.g., conditional statements to narrow down a list of choices, a 1-to-1 mapping function, etc.).

Figure 1:
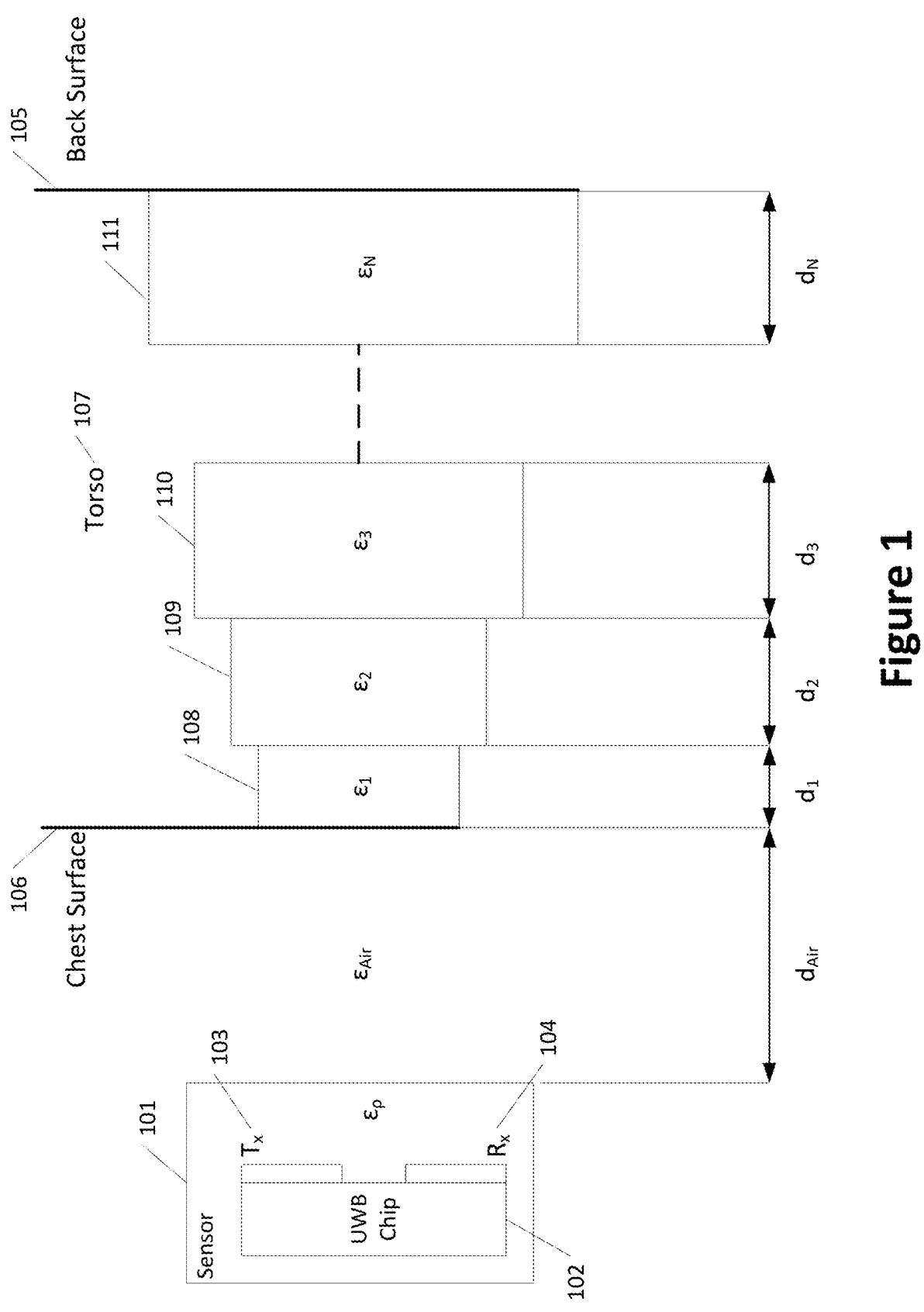
FIG. 1 shows an example of a system using reflectance-based imaging technology on a torso.

FIG. 1 shows an example of a system using reflectance-based imaging technology on a torso. FIG. 1 includes a sensor 101 with a UWB chip (e.g., an integrated circuit chip or combination of separate chips) that outputs and receives UWB signals through a transmit antenna Tx 103 and receive antenna Rx 104. Various distances are shown in FIG. 1 including $d_{air}$, $d_1$, $d_2$, $d_3$, and $d_n$, where $d_{air}$ is the distance from the transmit antenna Tx 103 to a surface 106 of the subject 107 (e.g., a chest surface of a torso) with a dielectric constant of $\epsilon_{air}$, $d_1$, is distance from surface 106 to a first transition between dielectric constants with the dielectric constant for the $d_1$ region 108 being represented by $\epsilon_{d1}$, $d_2$ is distance from the first transition to a second transition between dielectric constants with the dielectric constant for the $d_2$ region 109 being represented by $\epsilon_{d2}$, $d_3$ is distance from the second transition between dielectric constants to another transition between dielectric constants with the $d_3$ region having a dielectric constant represented by $\epsilon_{d3}$. Other regions of additional dielectric constants may appear and identified (e.g., a final region 111 with distance $d_n$ may have a dielectric constant $\epsilon_{dn}$ from a previous transition to another surface of the subject (e.g., a back surface 105).

Figure 2:
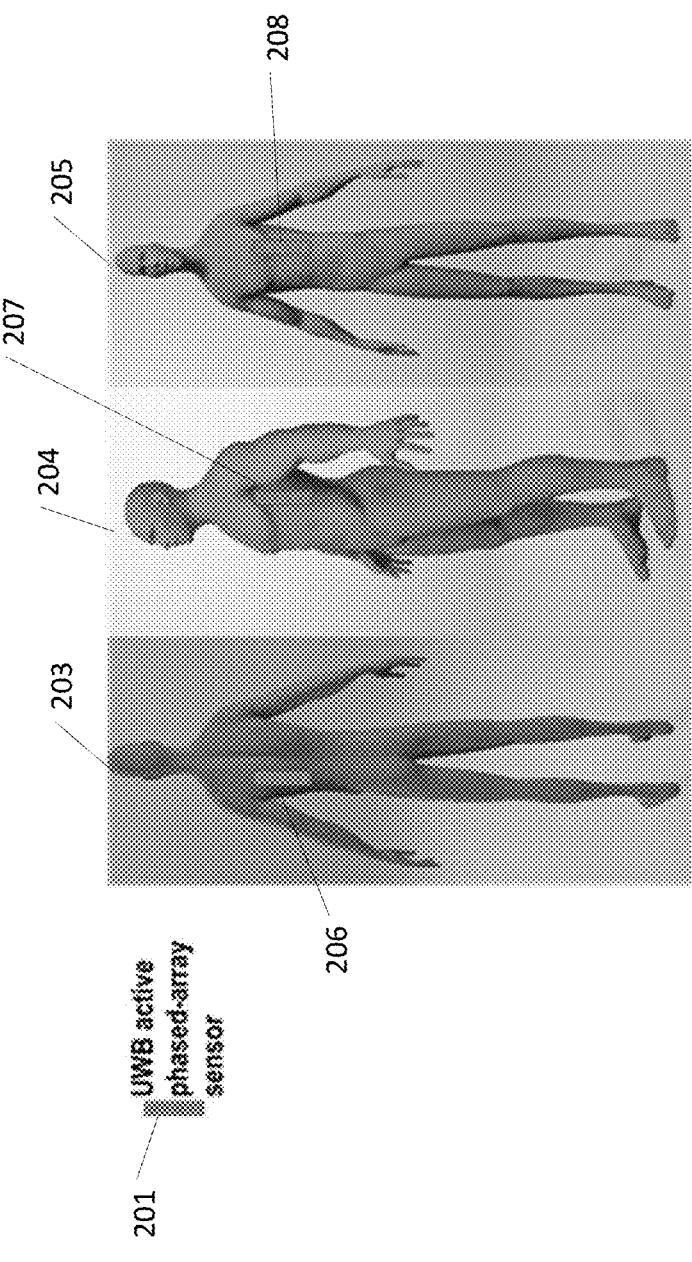
FIG. 2 shows an example of a subject with multiple sensors.

FIG. 2 shows an example of a subject with multiple sensors. A UWB active phased-array radar 201 may be placed on a subject at various locations including, from a back view, at location 206 at a back of the subject, from a side view 204, at location 207 on a side of the subject, and from a front view 205, at a front of the subject 208.

Figure 3:
FIG. 3 shows a two-dimensional cross-sectional image of the subject.

FIG. 3 shows a two-dimensional cross-sectional image of the subject.

Figure 4:
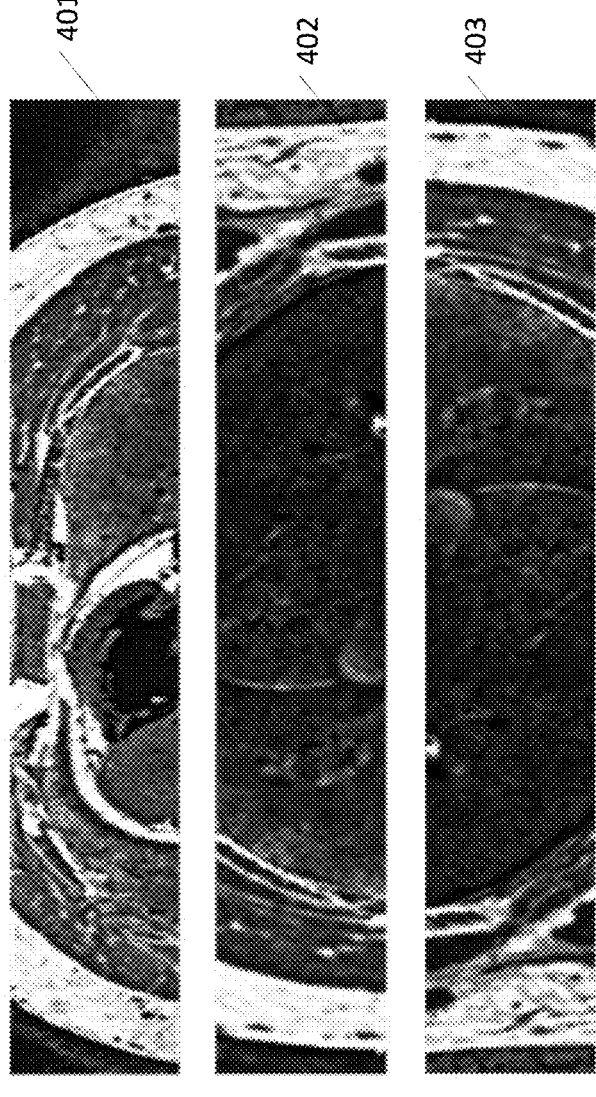
FIG. 4 shows a set of one-dimensional cross-sectional images of subject from a subject's left, front, and back sides.

FIG. 4 shows a set of one-dimensional cross-sectional images 401-403 of subject from a subject's left, front, and back sides.

Figure 5:
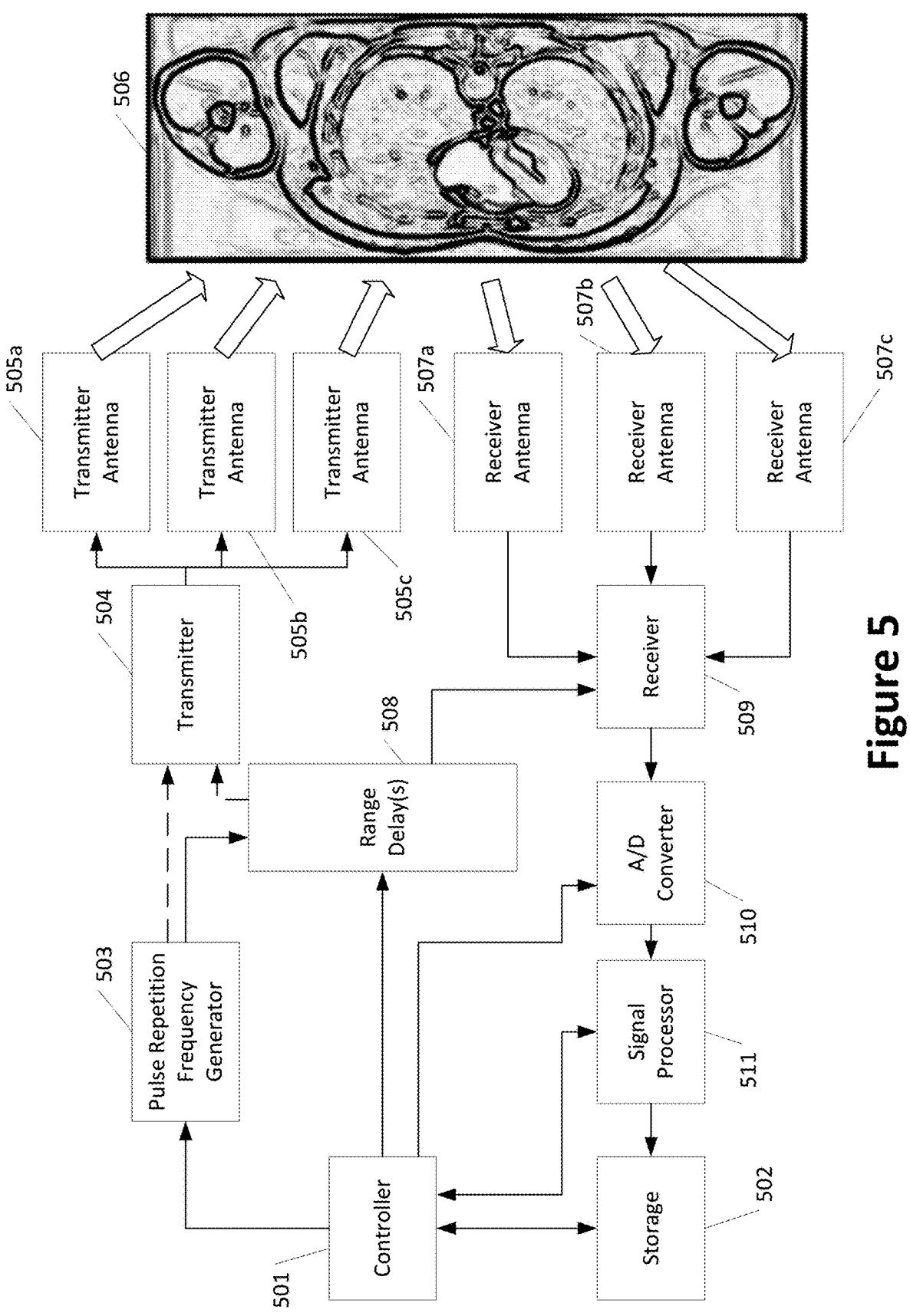
FIG. 5 shows examples of system architectures for single transmitter and receiver antennas and for an active, phased-array system.

FIG. 5 shows examples of system architectures for single transmitter and receiver antennas and for an active, phased-array system. A controller 501 outputs a control signal to a pulse repetition frequency generator 503. For a single array, the output of the pulse repetition frequency generator 503 is received by a transmitter 504 and output by transmitter antenna 505a to a subject 506. A reflected signal is received by receiver antenna 507a and sent to receiver 509.

Also, the output of the pulse repetition frequency generator 503 is received by a range delay circuit, a delay added as instructed by the controller 501, and output to the receiver 509. The receiver selectively decodes the received waveforms based on the bins associated with the distances $d_1$-$d_n$. The output of receiver 509 is converted from an analog signal into a digital signal via A/D converter 510. The results are interpreted by signal processor 511 and the results exchanged with the controller 501 and storage 502.

For a phased-array setup, the output of the pulse repetition frequency generator 503 is output to transmitter 504 (optionally also using range delay 508 to adjust each phase) and the resulting signals sent to respective output transmitter antennas 505a-505c. The signals reflect off various structures in subject 506 and are received by receiver antennas 507a-507c, respectively. The remaining processing is similar to the process described above but based on a phased-array combination of signals.

Figure 6:
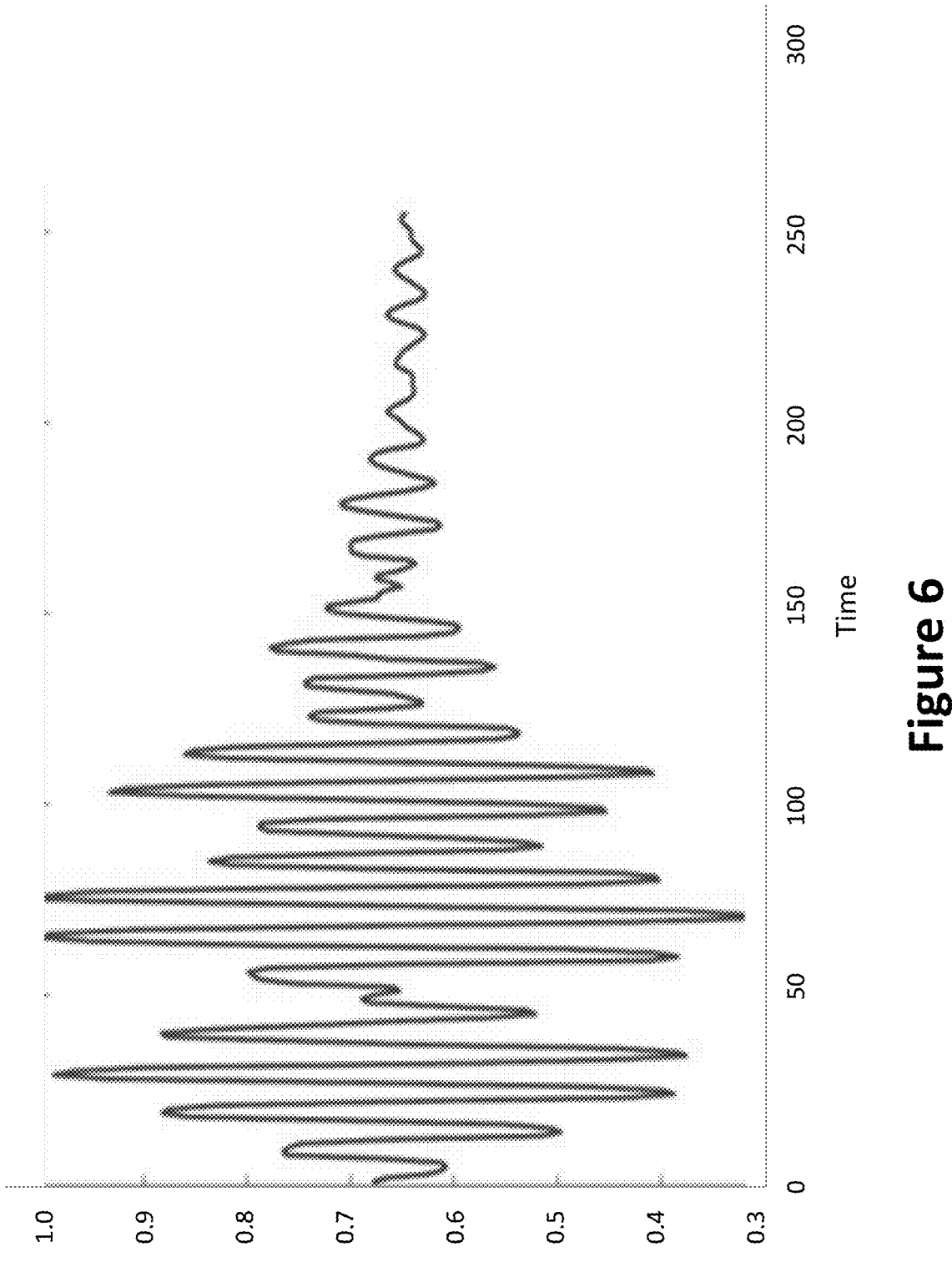
FIG. 6 shows a normalized amplitude of a reflected signal at a discretized set of fast-time samples versus time units.

FIG. 6 shows a normalized amplitude of a reflected signal at a discretized set of fast-time samples versus time units. The radar's transmitter generates a very short pulse, which can be but not limited to high-order Gaussian modulated pulse at a specific pulse repetition frequency. This pulse carries energy through a medium (e.g., air, liquid, body, etc.) from one location to another. Note that when the pulse reaches the end of the medium, a portion of its energy is reflected and, thereby, stays in the same medium while the remaining energy portion is transmitted in a different medium. In this respect, a received (or reflected) waveform is of the form shown in FIG. 6.

Let $F_s$ denote the sampling rate at which the reflected signal shown in FIG. 6 is sampled. Accordingly, the received waveform can be represented in vector format as $[a_1, a_2, \ldots, a_N]$, where each element in the vector denotes the normalized amplitude of a reflected signal at a specific unit of time over a window of N sampling time units in this dimension. As an example, N may be equal to 256 (used in the example of FIG. 6). From radar theory, N also represents the index of the maximum range bin at which the reflected signal sample is collected. Therefore, each range bin time span is equal to $$\frac{1}{F_s}$$

and each element in the above vector represents the reflected signal's sample in its corresponding range bin. Let $f_s$ denote the sampling rate at which the N-elements received waveform is recorded. Consequently, the sampling time vector that corresponds to $[a_1, a_2, \ldots, a_N]$ is $$\left[ \frac{1}{f_s} + \frac{1}{F_s}, \frac{1}{f_s} + \frac{2}{F_s}, \ldots, \frac{1}{f_s} + \frac{N}{F_s} \right].$$

The N-elements received waveforms are collected over a period of M units of sampling time in this dimension. As a result, $\mathcal{D}$ is obtained and may be represented by:

$$\mathcal{D} = \begin{pmatrix} a_{1,1} & a_{1,2} & \cdots & a_{1,N} \\ a_{2,1} & a_{2,2} & \cdots & a_{2,N} \\ \vdots & \vdots & \ddots & \vdots \\ a_{M,1} & a_{M,2} & \cdots & a_{M,N} \end{pmatrix},$$

where $a_{i,j}$ for $i \in \{1, 2, \ldots, M\}$ and $j \in \{1, 2, \ldots, N\}$, denote the normalized amplitude (or amplitude) of the i-th reflected signal sampled at the j-th time unit. The recording of a reflected signal or received waveform may be referred to as slow-time sampling (with a sampling frequency of $f_s$). On the other hand, fast-time sampling (with a sampling frequency of $F_s$) denotes the sampling rate at which the samples that comprise a given received waveform are collected. Note here that $F_s >>> f_s$ is a valid assumption.

Figure 7:
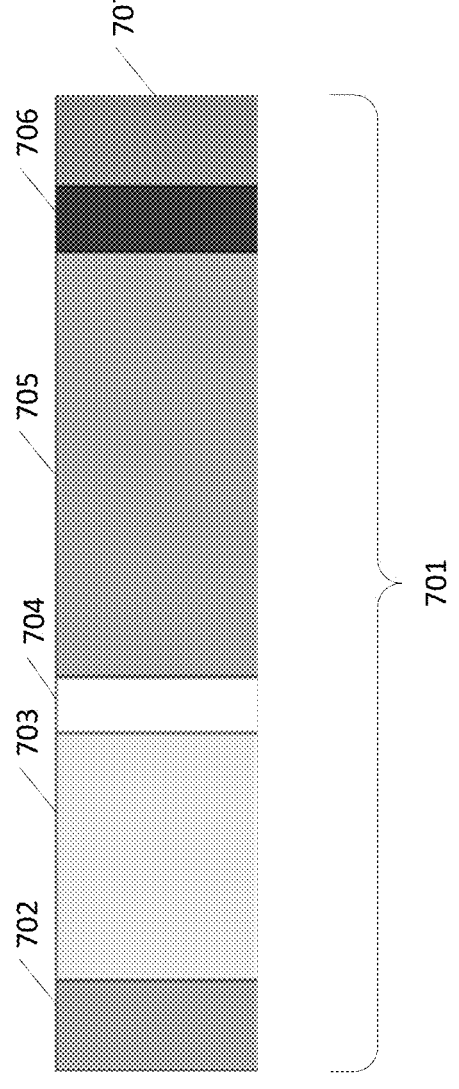
FIG. 7 shows an illustration of a reconstructed image with a grayscale/color map.

FIG. 7 shows an illustration of a reconstructed image with a grayscale/color map 701 with various dielectric constants shown over distances corresponding to the depth of the transitions between dielectric constants (e.g., 702-707).

The following describes various processes for processing received waveforms.

Phase 1: Pre-Processing

An autocorrelation routine may be used to strengthen the time-lagged signals in $\mathcal{D}$. This may be done by taking the correlation of a signal (i.e., a column in $\mathcal{D}$) with a delayed copy of itself as a function of delay. In order to do this, the autocorrelation of a signal $a_j$ in $\mathcal{D}$ (where $a_j = [a_{1,j}, a_{2,j}, \ldots, a_{M,j}]$) is computed based on:

$$\sum_{i=1}^{M} a_{i,j} a_{i-\tau, j} \forall j \in \{1, 2, \ldots, N\}.$$

Alternatively, one may compute the autocorrelation from the raw signal, e.g., $a_j$, using two Fast Fourier transforms (FFTs) according to:

IFFT[FFT[$a_j$](FFT[$a_j$])*], where IFFT is the inverse FFT and $(.)^*$ is the complex conjugate of $(.)$. The short-term fluctuations may be smoothed and longer-term trends may be highlighted by applying a simple Low-Pass FIR filter, e.g., a k-point moving average filter in both dimensions$\rightarrow \mathcal{R}$. This filter takes k samples of input at a time and compute the average of those k-samples and produces a single output point. The background clutter may be removed by subtracting the average of all waveforms in $\mathcal{R}$ from each signal in $\mathcal{R} \rightarrow \mathcal{X}$ where $$\mathcal{R} = \begin{pmatrix} a'_{1,1} & a'_{1,2} & \cdots & a'_{1,N} \\ a'_{2,1} & a'_{2,2} & \cdots & a'_{2,N} \\ \vdots & \vdots & \ddots & \vdots \\ a'_{M,1} & a'_{M,2} & \cdots & a'_{M,N} \end{pmatrix},$$

and $$\mathcal{X} = \begin{pmatrix} a''_{1,1} & a''_{1,2} & \cdots & a''_{1,N} \\ a''_{2,1} & a''_{2,2} & \cdots & a''_{2,N} \\ \vdots & \vdots & \ddots & \vdots \\ a''_{M,1} & a''_{M,2} & \cdots & a''_{M,N} \end{pmatrix}$$

$$= \begin{pmatrix} a'_{1,1} - \frac{1}{M}\sum_{i=1}^{M} a'_{i,1} & a'_{1,2} - \frac{1}{M}\sum_{i=1}^{M} a'_{i,2} & \cdots & a'_{1,N} - \frac{1}{M}\sum_{i=1}^{M} a'_{i,N} \\ a'_{2,1} - \frac{1}{M}\sum_{i=1}^{M} a'_{i,1} & a'_{2,2} - \frac{1}{M}\sum_{i=1}^{M} a'_{i,2} & \cdots & a'_{2,N} - \frac{1}{M}\sum_{i=1}^{M} a'_{i,N} \\ \vdots & \vdots & \ddots & \vdots \\ a'_{M,1} - \frac{1}{M}\sum_{i=1}^{M} a'_{i,1} & a'_{M,2} - \frac{1}{M}\sum_{i=1}^{M} a'_{i,1} & \cdots & a'_{M,N} - \frac{1}{M}\sum_{i=1}^{M} a'_{i,N} \end{pmatrix}.$$

The static DC component may be blocked by subtracting the average of all columns in $\mathcal{X}$ from each column in $\mathcal{X} \rightarrow \mathcal{Y}$ where $$\mathcal{Y} = \begin{pmatrix} a'''_{1,1} & a'''_{1,2} & \cdots & a'''_{1,N} \\ a'''_{2,1} & a'''_{2,2} & \cdots & a'''_{2,N} \\ \vdots & \vdots & \ddots & \vdots \\ a'''_{M,1} & a'''_{M,2} & \cdots & a'''_{M,N} \end{pmatrix}$$

$$= \begin{pmatrix} a''_{1,1} - \frac{1}{N}\sum_{j=1}^{N} a''_{1,j} & a''_{1,2} - \frac{1}{N}\sum_{j=1}^{N} a''_{1,j} & \cdots & a''_{1,N} - \frac{1}{N}\sum_{j=1}^{N} a''_{1,j} \\ a''_{2,1} - \frac{1}{N}\sum_{j=1}^{N} a''_{2,j} & a''_{2,2} - \frac{1}{N}\sum_{j=1}^{N} a''_{2,j} & \cdots & a''_{2,N} - \frac{1}{N}\sum_{j=1}^{N} a''_{2,j} \\ \vdots & \vdots & \ddots & \vdots \\ a''_{M,1} - \frac{1}{N}\sum_{j=1}^{N} a''_{M,j} & a''_{M,2} - \frac{1}{N}\sum_{j=1}^{N} a''_{M,j} & \cdots & a''_{M,N} - \frac{1}{N}\sum_{j=1}^{N} a''_{M,j} \end{pmatrix}.$$

Phase 2: Processing

The sampling times for any N-elements received waveform $b_i$, $\forall i \in \{1, 2, \ldots, M\}$ is given by $$\left[\frac{i}{f_s} + \frac{1}{F_s}, \frac{i}{f_s} + \frac{2}{F_s}, \ldots, \frac{i}{f_s} + \frac{N}{F_s}\right].$$

This said, one may compute the corresponding distances at which the elements of the recorded waveform ($b_i$) are sampled as follows:

$$d_i = \frac{V}{2} \times t_i = \frac{C}{2\sqrt{\epsilon_r}} \times t_i,$$

where V is the signal's propagation speed in a given medium, C is the speed of light in vacuum, $\epsilon_r$ is the dielectric constant of the medium, and $$t_i = \left[\frac{i}{f_s} + \frac{1}{F_s}, \frac{i}{f_s} + \frac{2}{F_s}, \ldots, \frac{i}{f_s} + \frac{N}{F_s}\right].$$

Reflected signal and recorded waveform are used interchangeably in this disclosure.

One may compute the reflection coefficient of each N-elements received waveform ($b_i$) at the j-th medium boundry, $\Gamma_{i,j}$, according to the following equation:

$$\Gamma_{i,j} = \frac{A_{i,j}^{ref}}{A_{i,j-1}^{inc}},$$

where $$A_{i,j}^{ref}$$

denotes the amplitude of the reflected signal ($b_i$) at the boundry of medium j and $$A_{i,j-1}^{inc}$$

represents the amplitude of the incident signal at the boundry of medium j−1. The reflection coefficient is defined as a parameter that describes how much of an electromagnetic wave is reflected by an impedance discontinuity in the transmission medium.

One may compute $$A_{i,j-1}^{inc}$$

based on:

$$A_{i,j-1}^{inc} = A_0^{inc} - \sum_{k=1}^{j-1} A_{i,k}^{ref},$$

where $$A_0^{inc}$$

is the transmitted signal's amplitude.

$\Gamma_{i,j}$ is also given by:

$$\Gamma_{i,j} = \frac{\sqrt{\epsilon_{r_{i,j-1}}} - \sqrt{\epsilon_{r_{i,j}}}}{\sqrt{\epsilon_{r_{i,j-1}}} + \sqrt{\epsilon_{r_{i,j}}}},$$

where $\epsilon_{r_{i,j-1}}$ and $\epsilon_{r_{i,j}}$ respectively denote the j−1-th and j-th dielectric constants of the propagation media in which the i-th reflected signal ($b_i$) is collected. Combined with the previous two equations and following a recursive solving order, the equation may be solved for $\epsilon_{r_{i,j}}$, $\forall j$ resulting in:

$$\epsilon_{r_{i,j}} = \epsilon_{r_{i,j-1}} \left(\frac{1 - \Gamma_{i,j}}{1 + \Gamma_{i,j}}\right)^2,$$

where $\epsilon_{r_{i,0}} \approx 1$, $\forall i$ given the assumption that the interface between devised apparatus and body is air.

These steps may be repeated for the remaining M−1 recorded waveforms. Consequently, an M×N matrix, $\varepsilon$, may be constructed that is filled with the computed dielectric constants. Accordingly, one obtains:

$$\varepsilon = \begin{pmatrix} \epsilon_{r_{1,1}} & \epsilon_{r_{1,2}} & \cdots & \epsilon_{r_{1,N}} \\ \epsilon_{r_{2,1}} & \epsilon_{r_{2,2}} & \cdots & \epsilon_{r_{2,N}} \\ \vdots & \vdots & \ddots & \vdots \\ \epsilon_{r_{M,1}} & \epsilon_{r_{M,2}} & \cdots & \epsilon_{r_{M,N}} \end{pmatrix}.$$

Phase 3: Post-Processing

For each column in $\varepsilon$, a clustering method (e.g., k-means, hierarchical clustering, a mixture of Gaussians, etc.) may be applied and, accordingly, the centroid of formed clusters and the number of nodes (elements) that each cluster is made of may be saved. Clustering is a technique for finding similarity groups in data, called clusters. Here, it attempts to group propagation media in a population together by similarity of their dielectric properties (constants). Clustering is often called an unsupervised learning approach, as ones dataset is unlabeled and there are no class values denoting a priori grouping of the data instances given. K-means is a method of vector quantization that aims to partition n observations into k clusters in which each observation belongs to the cluster with the nearest mean.

The centroid of a finite set of k points $$x_1, x_2, \ldots, x_k \text{ is } \frac{x_1 + x_2 + \ldots + x_k}{k}.$$

If only one cluster forms in column j, $j \in \{1, 2, \ldots, N\}$, for example, then its centroid value constitutes $\epsilon_{r_j}$. Otherwise, one selects $\epsilon_{r_j}$ to be equal to the cluster's centroid value with the highest number of elements attached. This said, the following is constructed:

$$\epsilon_r = \left[\epsilon_{r_1}, \epsilon_{r_2}, \ldots, \epsilon_{r_N}\right].$$

Furthermore, one applies the clustering method again, but on $\underline{\epsilon}_r$ this time in order to cluster its equal and/or approximate elements together. Then, the centroid value of each cluster substitutes the values of nodes or elements that are attached to it. Accordingly, $\underline{\epsilon}_r$ is updated.

A grayscale and/or color-map matching scheme may be used that assigns unique values in $\underline{\epsilon}_r$ to unique grayscale color codes. Note here that a grayscale color consists of equal intensities of each color in the RGB format. In order to do that, one, for example, may record the dielectric constant in $\underline{\epsilon}_r$ and convert that number into its hexadecimal representation (e.g., a 0 maps to #000000 in grayscale color code and 10 maps to #0A0A0A in grayscale color code).

The color codes may be obtained for values in $\underline{\epsilon}_r$ and, eventually, construct $\mathcal{I}$ (an image). For example, the image of FIG. 7 may be constructed for the unique elements in $\underline{\epsilon}_r$ that, in turn, maps to:

[#A0A0A0; #E1E1E1; #FFFFFF; #A4A4A4; #363636; #898989]

One or More Aspects May Include:

A process comprising: the generation and transmitting of waveforms as detailed in above; receiving one or more waveforms as shown in FIG. 6; strengthening the time-lagged signals; applying a k-point moving average in both dimensions to remove outliers and short-term fluctuations as described earlier; subtracting an average of all waveforms from each signal to remove clutter and the effect of static objects in the background; and blocking a DC component as defined in the signals pre-processing phase of the algorithm.

A process comprising: the sampling of any N-elements received waveform $b_i$, $\forall i \in \{1, 2, \ldots, M\}$; the evaluation of depths or distances at which the elements of the waveform $(b_i)$ are sampled based on previous equations; the computation of the reflection coefficient of each N-elements received waveform $(b_i)$ at the j-th medium boundry, $\Gamma_{i,j}$, according to aforementioned equations; the evaluation of the j's propagation medium dielectric constant, $\forall j$, based on previous equation; the direct measurement of medium j's dielectric constant, $\forall j$, using a vector network analyzer; the repetition of the aforementioned steps for the remaining $M-1$ recorded waveforms; and the construction of an M×N matrix, $\varepsilon$, filled using the computed dielectric constants.

A process comprising: the application of a clustering method (e.g., k-means, hierarchical clustering, a mixture of Gaussians, etc.) on columns in $\varepsilon$ and, accordingly, the recording of the centroid of each of them along with the number of elements each cluster is made of; the selection of one cluster that admits the maximum number of nodes or elements if there are more than one cluster in each column and the recording of its centroid value; the construction of $$\underline{\epsilon}_r = [\epsilon_1, \epsilon_2, \ldots, \epsilon_N]$$

in which each entry is the result of the clustering method; the use of clustering or a classification method (e.g., decision trees and random forests) on in order to group its equal and/or approximate elements together or classify them; the substitution of the values of elements in any cluster by its centroid value; the update of the implementation of a grayscale color-map matching scheme that assigns unique values in $\underline{\epsilon}_r$ to unique grayscale color codes by taking the dielectric constant in $\underline{\epsilon}_r$ and converting that number into its RGB hexadecimal representation; the display of the color codes as obtained for values in $\underline{\epsilon}_r$ and, eventually, obtaining an image; the implementation of a personalized color-map matching scheme that is user-defined and not limited to grayscale color codes in order to highlight certain functionalities (e.g., highlight blood flow going from the heart to extremities with a color that is different from its flow back to the heart).

A process comprising: a UWB-based radar (sensor) or some other type of radar (e.g., Doppler radar), Lidar (which stands for Light Detection and Ranging and is a remote sensing method that uses light in the form of a pulsed laser to measure ranges), or a camera-based sensor whether it is on-body or off-body; one or more UWB sensor and each sensor is supplied with either a single transmit and receive antennas or an active phased-array antenna which, in turn, is composed of many radiating elements each with its own transmitter-receiver unit and a phase shifter. The radiation beams, in this case, are formed by shifting the phase of the signal emitted from each radiating element, to provide constructive/destructive interference in order to steer the beams in the desired direction; the setup of UWB sensors in such a way that two or more dimensions are imaged, where each sensor can cover or target one dimension of the subject to be imaged by transmitting and receiving waveforms and, later, processing the information collected regarding the different propagation media's dielectric constants; (although not necessary from a system-functioning perspective) the synchronization of the UWB sensors' receivers' sweep via a master oscillator that sets the pulse repetition frequency of the sensors' emitted pulses and a controller issuing the sweep or scan commands; the transmission of signals' reflections to a signal processor and then a storage unit (i.e., a cloud, mobile phone, tablet, etc.) using wireless or wired connectivity; the pre- and post-processing of signals' reflections as described above using, but not limited to, learning methods (e.g., regression, decision trees, random forest, SVM, gradient-boosting algorithms, neural nets, Markov decision process, etc.) and signal processing techniques (e.g., sampling, filtering, autocorrelation, adaptive noise cancellation, etc.); the reconstruction of one or more cross-sectional subject' image, each corresponds to the dimension that the sensor is covering, also as described above; the fusion of multiple re-constructed one dimensional images or the information which was used to build those images (e.g., reflection coefficients and dielectric constants obtained in each imaging dimension) using a Kalman filtering approach in order to obtain a more complex, complete, and meaningful image of the subject that is of higher dimension.

A process comprising: the sensor as a stand-alone device used in both on-body and off-body imaging architectures, including but not limited to being mounted on an wall, in a bed, etc. in off-body architectures; the use of a machine just like medical imaging equipment or robot/s (used by doctors in surgeries for example) with one or more sensors respectively mounted on or built in one or more of the moving robotic arms.

A process comprising: the imaging of a subject or any part/organ of it (e.g., legs and hands in humans and animals, etc.); the real-time detection and tracking of organs, tissues, bones, fluids, and/or physiological abnormalities (e.g., functional, organic, metabolic, etc.), including but not limited to tumors, based on the image reconstructed (tumors have dielectric properties that are different from those of the body organ they are attached to or exist in for example); the providing of feedback (by the physician) based on the localization and detection of a target (tumor for example) as well as the tracking performance to make better and more efficient clinical decisions in terms of preventive (e.g., screening), predictive, and/or diagnosing measures (e.g., not being able to detect an onset of an illness or a disease such as tumors in the lungs or edema compared to using this imaging functionality to detect such illnesses and, accordingly, allow physicians to assess and investigate these conditions more thoroughly).

A process comprising: the fusion of the reconstructed image (or the data processed leading to the image reconstruction) with different information coming from different sources and/or sensors to make more reliable inferences on particular phenomena of interest and draw new learnings.

A process comprising: a separate radar chip (e.g., a silicon chip) and its corresponding transmitter-receiver antennas whether single or in the form of a phased array, or one application-specific integrated circuit (ASIC) that incorporates a radar, antennas of any suitable form, required hardware components, and any firmware or software setup including the processes to perform the required task.

A process comprising: the ability to use machine learning methods and/or artificial intelligence techniques (e.g., regression, decision trees, random forest, gradient-boosting algorithms, neural nets, Markov decision process, etc.) on the reflected signals in order to infer robust and useful information which, in turn, can be fed back to a controller that would automatically adjust the antenna beams (one or more) as to maximize the signal-to-noise ratio (intelligent beamforming).

What is claimed is:

1. A process comprising:
placing, at a first location of a subject, a housing comprising a radar transceiver;
generating waveforms;
transmitting, based on the placing at the first location and based on the generating the waveforms and via a transmit antenna of the radar transceiver, the waveforms;
receiving as signals, via a receive antenna, reflections of the waveforms;
processing the signals by:
generating a time-delayed copy of the received signals;
autocorrelating the received signals with the time-delayed copy of the received signals;
determining, based on the autocorrelated signals, a k-point moving average; and
blocking a direct current (DC) component by subtracting the k-point moving average from each signal of the autocorrelated signals;
storing, in a storage, the autocorrelated signals with the blocked DC component;
placing, at a second location of the subject, the housing; and
repeating the transmitting, receiving, processing, and storing steps for signals received at the second location.

2. The process of claim 1,
wherein the k-point moving average is applied to remove outliers and short-term fluctuations.

3. The process of claim 1,
wherein subtracting the k-point moving average from each received signal removes clutter and static objects.

4. An apparatus comprising:
a radar transceiver configured to generate waveforms;
a transmit antenna connected to the radar transceiver, wherein the transmit antenna is configured to transmit the generated waveforms;
a receive antenna;
a memory storing instructions;

12 one or more processors connected to the receive antenna and configured to, when executing the instructions, cause the apparatus to:
transmit, at a first time period, the generated waveforms;
receive as first signals, via the receive antenna, first reflections of the waveforms;
process the first signals by causing the apparatus to:
generate a first time-delayed copy of the received first signals;
autocorrelate the received first signals with the first time-delayed copy of the received first signals;
determine, based on the first autocorrelated signals, a first k-point moving average; and
block a first direct current (DC) component by subtracting the first k-point moving average from each signal of the first autocorrelated signals;
store, in a storage, the first autocorrelated signals with the blocked DC component;
transmit, at a second time period, the generated waveforms;
receive as second signals, via the receive antenna, second reflections of the waveforms;
process the second signals by causing the apparatus to:
generate a second time-delayed copy of the received second signals;
autocorrelate the received second signals with the second time-delayed copy of the received second signals;
determine, based on the second autocorrelated signals, a second k-point moving average; and
block a second direct current (DC) component by subtracting the second k-point moving average from each signal of the second autocorrelated signals; and
store, in the storage, the second autocorrelated signals with the blocked DC component.

5. The apparatus of claim 4,
wherein the first k-point moving average is applied to remove outliers and short-term fluctuations.

6. The apparatus of claim 4,
wherein subtracting the first k-point moving average from each received first signal removes clutter and static objects.

7. A process comprising:
receiving, via a receive antenna positioned at a first location on a subject and as first signals, first reflections of waveforms;
processing the first signals by:
sampling the first signals as M signals in N sampling time units, wherein the N sampling time units represent N-elements in a received waveform $b\_i$, where $\forall i \in \{1, 2, \ldots, M\}$;
for each M signal,
determining distances at which the N-elements are sampled; and
determining a reflection coefficient, $\Gamma\_{(i,j)}$, of each of the N-elements at a j-th medium boundary between mediums;
determining, for each medium, a dielectric constant of the medium $\forall j$ using a vector network analyzer; and
constructing an M×N matrix, E, of the determined dielectric constants;
receiving, via the receive antenna positioned at a second location on a subject and as second signals, second reflections of the waveforms; and
repeating the processing for the second signals.

8. An apparatus comprising:

a radar transceiver configured to generate waveforms;

a transmit antenna connected to the radar transceiver, wherein the transmit antenna is configured to transmit the generated waveforms;

a receive antenna;

a memory storing instructions;

one or more processors connected to the receive antenna and configured to, when executing the instructions, cause the apparatus to:

receive, at a first time period via the receive antenna as first signals, first reflections of the generated waveforms;

process the first signals by causing the apparatus to:

sample the first signals as M signals in N sampling time units, wherein the N sampling time units represent N-elements in a received waveform $b_i$, where $\forall i \in \{1, 2, \ldots, M\}$;

for each M signal, determine distances at which the N-elements are sampled; and determine a reflection coefficient, $\Gamma_{(i,j)}$, of each of the N-elements at a j-th medium boundary between mediums;

determine, for each medium, a dielectric constant of the medium $\forall j$ using a vector network analyzer; and construct an M×N matrix, E, of the determined dielectric constants;

receive, at a second time period via the receive antenna as second signals, second reflections of the generated waveforms; and repeating the process for the second signals.

\* \* \* \* \*